A. JORDAHL.
MEANS FOR SUSPENDING OBJECTS FROM REINFORCED CONCRETE STRUCTURES.
APPLICATION FILED JULY 2, 1914.

1,155,243. Patented Sept. 28, 1915.

Inventor:
Anders Jordahl,
By:- B. Singer

UNITED STATES PATENT OFFICE.

ANDERS JORDAHL, OF BERLIN-WILMERSDORF, GERMANY.

MEANS FOR SUSPENDING OBJECTS FROM REINFORCED CONCRETE STRUCTURES.

1,155,243. Specification of Letters Patent. Patented Sept. 28, 1915.

Application filed July 2, 1914. Serial No. 848,631.

*To all whom it may concern:*

Be it known that I, ANDERS JORDAHL, engineer, a subject of the King of Norway, and residing at Jenaerstrasse 22, Berlin-Wilmersdorf, Germany, have invented certain new and useful Improvements in Means for Suspending Objects from Reinforced Concrete Structures.

This invention has reference to improved means for securing and supporting brackets, plumber-blocks or other fittings on ceilings, beams, walls or the like constructed of reinforced concrete, the said means consisting essentially of a channel iron girder of a particular form intended to be embedded in the known manner in the ceiling, beam, wall or the like and to receive the heads of bolts or like fastening means the stems of which project through a slot in the girder, the said heads being likewise of a particular form.

Figure 1:
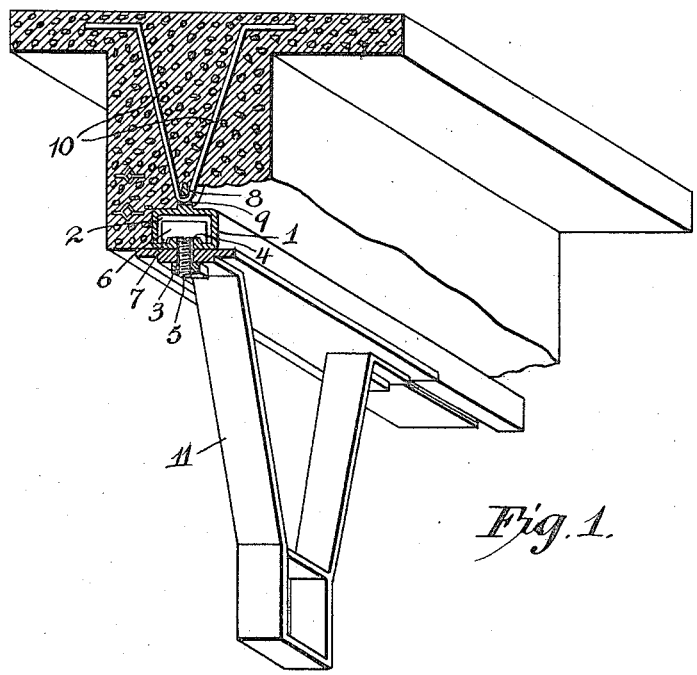
Figure 2:
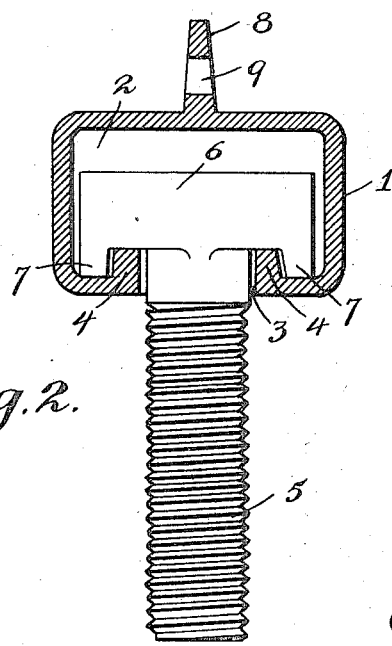

I have illustrated my invention in the accompanying drawing, in which:

Figure 1 shows a section of a reinforced-concrete beam in which one form of my improved channel iron girder is shown embedded, and Fig. 2 shows a section of the channel iron girder separately, with a bolt mounted in same.

The girder 1 shown in the drawing is of rectangular cross-section, but I wish it to be understood that the invention is not limited to this particular shape, the characteristic features being that the girder is formed with vertical ribs 4 and adapted to be engaged with reinforcing irons embedded in the body of the concrete. The hollow space 2 receives the head 6 of a bolt, the stem 5 of which projects through a slot 3 which may extend the whole or part of the length of the girder. The ribs 4 are formed on the girder at the sides of the slot to receive overhanging projections 7 formed on the underside of the head of the bolt for the purpose of preventing the bolt from rotating unless the bolt is pushed upward clear of the said ribs 4. The head 6 of the bolt is rectangular in cross-section and its dimensions such that when raised from its seat and turned at right angles to the position shown in Fig. 2 it can be withdrawn through the opening 3.

The upper portion of the girder 1 is formed with an upstanding rib 8 in which apertures 9 are formed in which angle irons 10 that are intended to be embedded in the concrete are engaged.

I have shown in Fig. 1 by way of example a plumber-block 11, mounted in accordance with my invention, but I wish it to be understood that the invention is equally applicable for securing or suspending any kind of fittings such as lamps, pipes, etc.

Flat bars of iron bent as indicated in the drawing are very suitable for securing the girder 1, and it is advisable to provide sheet metal caps for the open ends of the girders to prevent the concrete finding its way into the channel.

I claim:

A slotted hollow means for suspending objects from reinforced concrete and other structures and for the reception of securing bolts for plumber-blocks comprising in combination, horizontal flanges forming the walls of said slot, reinforcing lugs on said flanges extending into the hollow profile space and bolt heads provided with grooves into which said lugs engage with a limited play, substantially as described.

In testimony whereof I have hereunto set my hand in presence of two witnesses.

ANDERS JORDAHL.

Witnesses:
HANS PFEFFER,
CURT SCHROEDER.